(12) United States Patent
Wu et al.

(10) Patent No.: US 8,982,702 B2
(45) Date of Patent: Mar. 17, 2015

(54) CONTROL OF RATE ADAPTIVE ENDPOINTS

(71) Applicant: Cisco Technology, Inc., San Jose, CA (US)

(72) Inventors: Duanpei Wu, San Jose, CA (US);
Shih-Cheng Yang, Saratoga, CA (US);
Anand Oswal, Pleasanton, CA (US);
Wenyi Wang, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 109 days.

(21) Appl. No.: 13/664,093

(22) Filed: Oct. 30, 2012

(65) Prior Publication Data
US 2014/0119183 A1    May 1, 2014

(51) Int. Cl.
H04L 12/26    (2006.01)
H04L 12/813    (2013.01)
H04L 12/823    (2013.01)

(52) U.S. Cl.
CPC ............... *H04L 47/32* (2013.01); *H04L 47/20* (2013.01)
USPC ......................................... 370/235

(58) Field of Classification Search
None
See application file for complete search history.

(56) References Cited

U.S. PATENT DOCUMENTS

| | | | |
|---|---|---|---|
| 5,400,329 A * | 3/1995 | Tokura et al. ................ | 370/232 |
| 6,757,255 B1 * | 6/2004 | Aoki et al. ................ | 370/252 |
| 6,937,770 B1 | 8/2005 | Oguz et al. | |
| 6,996,123 B1 | 2/2006 | Jiang et al. | |
| 7,016,410 B2 | 3/2006 | Chang et al. | |
| 7,075,987 B2 | 7/2006 | Kim et al. | |
| 7,203,638 B2 | 4/2007 | Jelinek et al. | |
| 7,236,640 B2 | 6/2007 | Subramaniam et al. | |
| 7,263,126 B2 | 8/2007 | Zhao et al. | |
| 7,313,520 B2 | 12/2007 | Plummer | |
| 7,376,180 B2 | 5/2008 | Feher | |
| 7,391,918 B2 | 6/2008 | Subramaniam et al. | |
| 7,529,288 B2 | 5/2009 | Felbecker et al. | |
| 7,557,980 B2 | 7/2009 | Lu | |
| 7,643,418 B1 * | 1/2010 | Varier et al. ................ | 370/232 |
| 7,952,999 B1 * | 5/2011 | Jiang et al. ................ | 370/229 |
| 7,983,355 B2 | 7/2011 | Catreux et al. | |
| 7,987,396 B1 | 7/2011 | Riani et al. | |
| 7,996,234 B2 | 8/2011 | Dieterich et al. | |
| 8,009,963 B2 | 8/2011 | Panda et al. | |
| 8,107,525 B1 | 1/2012 | Chan et al. | |
| 8,248,932 B2 * | 8/2012 | Wang et al. ................ | 370/231 |
| 8,275,625 B2 | 9/2012 | Dieterich et al. | |
| 8,509,074 B1 * | 8/2013 | Roberts et al. ............... | 370/232 |
| 2002/0012395 A1 * | 1/2002 | Song et al. ................ | 375/240.03 |
| 2004/0233846 A1 * | 11/2004 | Khandani et al. ............. | 370/235 |
| 2005/0216731 A1 * | 9/2005 | Saito et al. ................... | 713/153 |
| 2005/0226149 A1 * | 10/2005 | Jacobson et al. .............. | 370/229 |
| 2006/0133280 A1 * | 6/2006 | Natchu ........................ | 370/235 |
| 2011/0007631 A1 * | 1/2011 | Raina et al. ................... | 370/230 |
| 2013/0058214 A1 * | 3/2013 | Foglar et al. ............... | 370/230.1 |
| 2013/0322255 A1 * | 12/2013 | Dillon ........................ | 370/236 |

* cited by examiner

*Primary Examiner* — Anh-Vu Ly

(57) ABSTRACT

An apparatus may receive a plurality of data streams for transmission over a network. The apparatus may adjust packet drop rates in proportion to differences between actual bit rates and target bit rates of the data streams. Information about the adjusted packet drop rates may be provided to rate adaptive endpoints that are generating the data streams. The rate adaptive endpoints may respond to the information by adjusting the bit rates at which the data streams are encoded. Over one or more time intervals, the bit rates are adjusted to levels that yield a transmission of the data streams that is both balanced and unbiased.

24 Claims, 5 Drawing Sheets

CONTROL OF RATE ADAPTIVE ENDPOINTS

FIELD

The present embodiments relate to rate adaptation, and more particularly, to achieving an unbiased bit-rate balance among data streams being communicated over a network.

BACKGROUND

Network congestion in a communication network may occur when multiple data streams being communicated over the network are using a full or maximum amount of bandwidth of the network. The congestion may be caused by various factors, including the bursting nature of media or video traffic, bit-rate variation among frames of a data stream, bandwidth shared with other applications, bandwidth variation due to low-level carrying media change, and/or bandwidth oversubscription (i.e., injecting more data streams than allowed by the bandwidth of the network). Network congestion may cause network devices to drop packets, resulting in stream intermittence and quality degradation.

DETAILED DESCRIPTION

Overview

Figure 1:
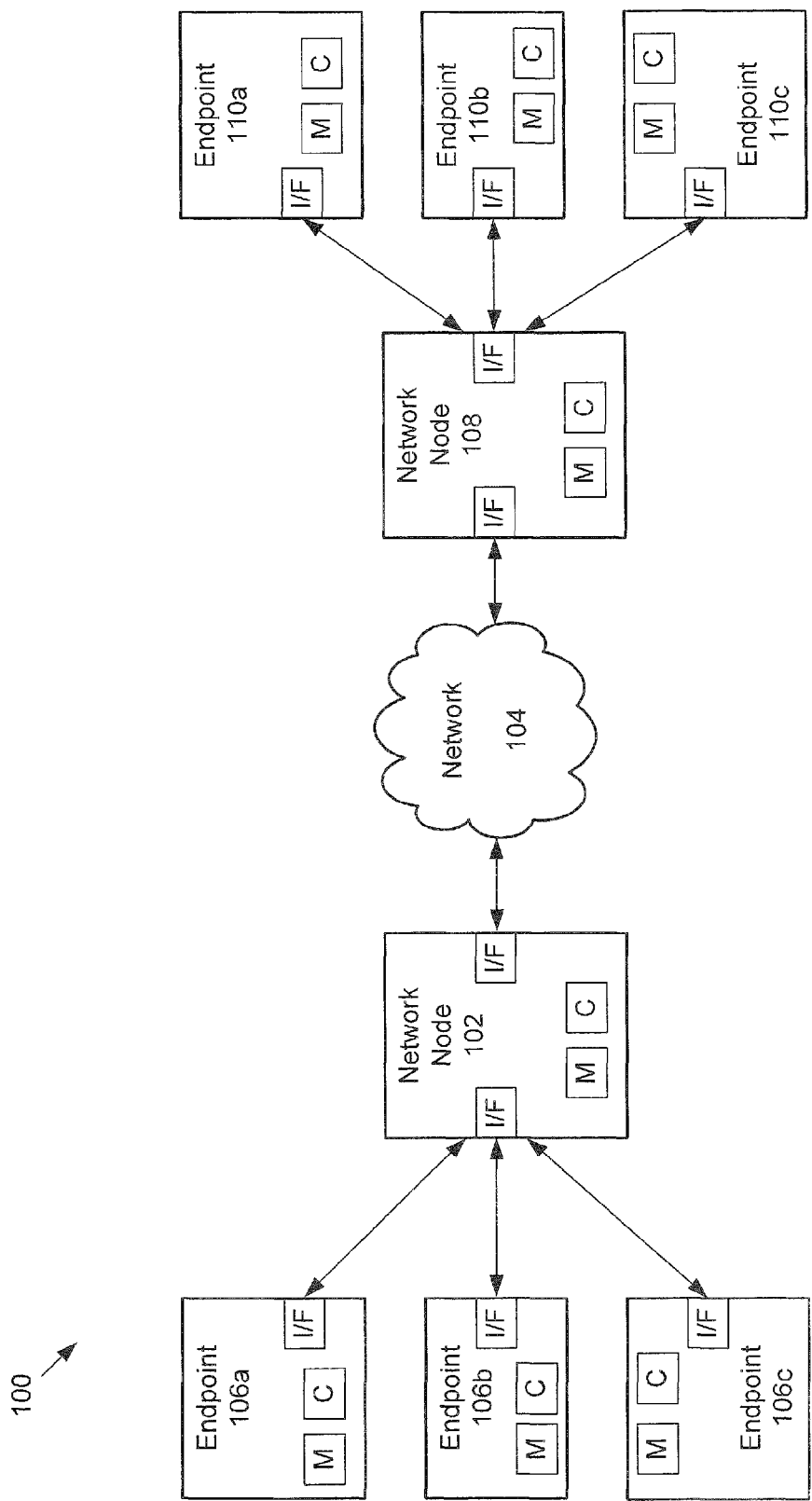
FIG. 1 illustrates an example network system that includes network nodes communicating data streams generated by endpoints over a network.

An apparatus includes one or more network interfaces configured to receive a plurality of data streams and transmit the plurality of data streams over a network. The apparatus includes a processor in communication with the one or more network interfaces. For each of the data streams, the processor may be configured to determine a difference between an actual bit rate and a target bit rate of the data stream, and determine whether to adjust a packet drop rate based on the difference.

DESCRIPTION OF EXAMPLE EMBODIMENTS

The present description describes a system that includes one or more network nodes that control the adjustment or adaptation of bit rates of data streams performed by endpoints to levels such that transmission of the data streams may be balanced and unbiased. A transmission of a data stream is balanced when no packets or substantially no packets are being dropped during the transmission. Conversely, the transmission is unbalanced when packets are being dropped. A transmission of data streams is unbiased when the bit rates of the data streams are equal or substantially equal. Conversely, the transmission is biased when the bit rates of the data streams are unequal or substantially unequal. In other words, when the transmission is biased, there is disparity among the bit rates of the data streams.

Network congestion may occur when more data streams are being communicated over a network than the bandwidth of the network may allow. As a result, packets in the data streams may be dropped. One way to overcome network congestion is to reduce the bit rates at which the data streams are being transmitted. In order to reduce the bit rates, the endpoints (i.e., the terminals of the system that transmit and receive the data streams), may be configured to be rate adaptive. By being rate adaptive, the endpoints transmitting the data streams may adjust the bit rates at which the streams are being transmitted. The bit rates of the data streams may be adjusted at predetermined times or time intervals. When network congestion occurs, the endpoints may reduce the bit rates in order to minimize packet drop and make the overall transmission balanced.

Endpoints may be rate adaptive by being configured to operate with a rate adaption algorithm or scheme. Under the rate adaption algorithm or scheme, an endpoint may determine how much to adjust or reduce the bit rate by being configured to map an amount of bit rate reduction to a packet drop rate. The rate at which packets are being dropped may determine how much the endpoint reduces the bit rate. For some rate adaption schemes or algorithms, the mapping may be based on percentages. That is, the percent reduction in bit rate may be based on and/or proportional to the packet drop rate percentage. Additionally, the rate adaption algorithm or scheme have an adjustment speed, which may be a time, time interval, or rate at which the endpoint determines to make a bit rate adjustment. Some example rate adaption algorithms or schemes may have an adjustment speed specifying an adjustment to be made at predetermined time intervals, such as every five seconds or every ten seconds, although other adjustment speeds may be used.

In some network systems, all of the endpoints may not be configured with the same rate adaption algorithms or schemes. As such, endpoints with different rate adaption algorithms or schemes may adjust bit rates differently, such as by mapping bit rate reduction to packet drop rate differently. In addition or alternatively, endpoints with different rate adaption algorithms or schemes may adjust bit rates at different times and/or at different adjustment speeds. As a result, although a balanced transmission of the data streams may be achieved due to the rate adaptive capabilities of the endpoints, the balanced transmission may be biased in that the bit rates among the data streams when the transmission is balanced may be different. Network condition fluctuation, such as delay and bandwidth, may also contribute to adaptive endpoints transmitting balanced, but biased, data streams. For some network communication systems, a transmission or communication of data streams over a network that is both balanced and unbiased may be desirable.

FIG. 1 shows an example system 100, such as a network communication system, that may include a first network node 102 that is configured to control and/or manage the transmission or communication of data streams so that the transmission or communication is both balanced and unbiased. The first network node 102 may be an apparatus or a plurality of apparatuses that includes at least one network device, such as a router or a switch. The first network node 102 may be configured to be connected to and communicate data streams over the network 104. The first network node 102 may also be in communication with one or more endpoints 106*a-c*. Each of the endpoints 106*a-c* may be a terminal of the system 100. The endpoints 106*a-c* may be configured to generate, encode, transmit, receive, and/or process data streams. Each of the endpoints 106a-c may be configured to transmit a data stream and/or other information to the first network node 102. The first network node 102 may receive the data streams from the endpoints 106a-c, and upon receipt, the first network node 102 may be configured to transmit the data streams over the network 104. In addition, the first network node 102 may receive data streams or other information from over the network 104 and provide the data streams or other information to the endpoints 106a-c. The first network node 102, by communicating with the endpoints 106a-c without the communications being over the network 104, may be considered and/or referred to as being a local network node to the endpoints 106a-c.

The example system 100 may also include a second network node 108, which like the first network node 102, may be an apparatus or a plurality of apparatuses that includes at least one network device, such as a router or a switch, that is configured to be connected to and communicate data streams over the network. The second network node 108 may also be in communication with one or more endpoints 110a-c. Each of the endpoints 110a-c may be a terminal of the system 100. The endpoints 110a-c may be configured to generate, encode, transmit, receive, and/or process data streams. Each of the endpoints 110a-c may be configured to transmit a data stream and/or other information to the second network node 108. The second network node 108 may receive the data streams from the endpoints 110a-c, and upon receipt, the second network node 108 may be configured to transmit the data streams over the network 104. In addition, the second network node 108 may receive data streams or other information from over the network 104 and provide the data streams or other information to the endpoints 110a-c. The second network node 108, by communicating with the endpoints 110a-c without the communications being over the network 104, may be considered and/or referred to as being a local network node to the endpoints 110a-c.

In some situations, the endpoints on one side of the network 104 may transmit data streams, and the endpoints on the other side of the network 104 may receive the transmitted data streams. For example, the endpoints 106a-c may transmit data streams—such as media streams, video streams, audio streams, audio/video (A/V) streams, as examples—over the network 104 to the endpoints 110a-c. The endpoints 106a-c may transmit the data streams to the first network node 102, which may transmit the data streams over the network 104 to the second network node 108. The second network node 108 may receive the data streams, and upon receipt, may send the data streams to the endpoints 110a-c. The endpoints that transmit the data streams may be referred to as transmitting endpoints that are located at a transmitting side of the network 104. The endpoints that receive the data streams may be referred to as receiving endpoints that are located at a receiving side of the network 104.

The endpoints 106a-c and/or the endpoints 110a-c may be rate adaptive endpoints in that they may be configured to operate with a rate adaption algorithm or scheme and adjust the bit rates of the data streams in accordance with the rate adaption algorithm or scheme, such as when encoding the data streams. Alternatively, one or more of the endpoints 106a-c and/or one or more of the endpoints 110a-c may be non-rate adaptive endpoints in that they may not be configured to operate with a rate adaption algorithm or scheme. As such, a non-rate adaptive endpoint may be incapable of adjusting a bit rate of a data stream that it encodes.

In some example configurations of the example system 100, if an endpoint 106a-c, 110a-c is a non-rate adaptive endpoint, that endpoint may be configured to communicate and/or operate with an associated rate adaption device or mechanism that may adjust the bit rate of the data stream before the data stream is sent the respective network node 102, 108. As such, in the example system 100, each endpoint that transmits data over the network 104 may be capable of sending data streams with adaptive or adjustable bit rates to its respective network node 102, 108, whether it is because the endpoint is configured to operate with a rate adaptive algorithm or scheme or because the endpoint sends the data stream to an associated rate adaption device or mechanism before the data stream is sent to the network node. Hereafter, bit rate adaptation or adjustment, whether performed by the endpoint itself or by a rate adaption device or mechanism associated with the endpoint, will generally be referred as being performed by an endpoint.

Transmitting endpoints may be configured to adjust the bit rates of the data streams based on packet drops. For example, the transmitting endpoints may adjust the bit rates of the data streams by receiving information about packet drops, such as a packet drop rate or an amount of packet drops, of the data streams. Each endpoint may then adjust the bit rate based on and/or in proportion to the packet drop information. The packet drop information may be received as feedback information or as part of feedback information describing the transmission or communication of the data streams. The feedback information may be provided to the transmitting endpoints from the local network node, which may have generated the feedback information, received the feedback information from the network node and/or a receiving endpoint on the other side of the network 104, or some combination thereof.

In some example configurations, the feedback information may be communicated in the form of a report, such as a Real-time Transport Protocol Control Protocol (RTCP) report. The report may be created and/or transmitted periodically and/or at predetermined intervals. For example, in response to data streams being transmitted from endpoints 106a-c to endpoints 110a-c, a RTCP report may be generated at the receiving end, such as by one or more of the endpoints 110-a-c and/or the second network node 108, and may be transmitted over the network 104 from the second network node 108 to the first network node 102. The feedback information may be communicated in ways or forms other than reports or RTCP reports, such as other in-band or out-of-band signaling configured to carry the feedback information. The first network node 102 may then send the report to the endpoints 106a-c. Based on the packet drop information included in the report, the endpoints 106a-c may adjust the bit rates of the data streams, if necessary. The RTCP report may be generated and/or transmitted periodically or at predetermined intervals over the network 104.

Each network node may be configured to intentionally drop packets based on a total stream bit rate (i.e., the sum of the bits rates) of the data streams that the network node receives. If the total stream bit rate exceeds the network bandwidth, then the network node may be configured to drop packets in the received data streams at a rate that may be determined based on a comparison of the total stream bit rate and the network bandwidth. For example, if the first network node 102 receives data streams from the endpoints 106a-c at bit rates such that a total stream bit rate exceeds the bandwidth that the network 104 can handle, then the first network node 102 may be configured to drop packets at a rate that corresponds to the amount that the total stream bit rate exceeds the network bandwidth. The first network node 102 may then transmit the data streams with dropped packets over the network 104. The rate at which the packets are being dropped by the first network node 102 may be reflected or indicated in the feedback information received from over the network 104.

Each local network node may be configured to control or cause the adjustment or adaptation of the bit rates performed by the endpoints such that the endpoints adjust the bit rates to levels where transmission of the data streams is both balanced and unbiased. To do so, the local network node may adjust the rate at which it drops packets based on a comparison of actual bit rates of the data streams and target bit rate. The target bit rate may be a bit rate that yields a balanced and unbiased transmission of the data streams. In other words, the target bit rate may be a bit rate that the local network node determines for a data stream so that transmission of the data streams is balanced and unbiased. Based on the comparison, the local network node may determine to adjust, such as by increasing or decreasing, its packet drop rate. Information about the adjusted packet drop rate may then be sent to the endpoints, which may adjust the bit rates of the data streams to levels in accordance with the adjusted packet drop rate information. By causing or controlling the endpoints to adjust bit rates to levels by adjusting the rate at which the local network node is dropping the packets, transmission of the data streams may be both balanced and unbiased.

The following describes, in more detail, actions that a local network node may perform to control the adjustment of the bit rates by the endpoints. Reference is made to the first network node 102 as being the local network node to endpoints 106a-c, where the endpoints 106a-c are transmitting data streams over the network 104 to the endpoints 110a-c.

The local network node 102 may be configured to determine a target bit rate for each data stream that it receives for transmission over the network 104. In one example way or method to determine the target bit rate, the local network node 102 may determine, for each data stream, an initial bit rate. The initial bit rate may be a bit rate at which the endpoint 106a, 106b, or 106c initially wants to transmit the data stream. The local network node 102 may also determine a total bandwidth $BW_t$ that is available to the local network node 102 for transmission of the data streams. The initial bit rates for the streams and/or the total bandwidth $BW_t$ may be determined through an initial configuration or an initial setup session, such as a call setup, for the data streams. In addition, from the initial bit rates, the local network node 102 may determine a total stream bit rate, $BT_t$. The total stream bit rate $BT_t$ may be the sum of the initial bit rates for all of the data streams. The local network node 102 may then determine the target bit rate for each stream using the initial bit rates, the total bandwidth $BW_t$, and the total stream bit rate $BT_t$. The target bit rate may be based on a ratio of the total bandwidth $BW_t$ and the total stream bit rate $BT_t$. In one particular example, for an nth data stream, the target bit rate may be ratio of the total bandwidth $BW_t$ to the total stream bit rate $BT_t$, multiplied by the initial bit rate of the nth data stream, which may be represented using the following equation:

$$TargetBitRate[n] = \left(\frac{BW_t}{BT_t}\right) * InitialBitRate[n].$$

This method of determining the target bit rate may assume that the total bandwidth $BW_t$ is available for transmission of the data streams. However, in some situations, the total bandwidth $BW_t$ may not be available. When the total bandwidth $BW_t$ is not available, the local network node 102 may determine an estimated target bit rate for each data stream. The estimated target bit rate may be determined by obtaining the sum of the maximum bit rates of the data streams and dividing that sum by the number of data streams. The maximum bit rate is described in more detail below. The estimated target bit rate may be updated every time the local network node 102 receives feedback information, such as in the form of an RTCP report.

In addition to determining a target bit rate for each data stream, the local network node 102 may be configured to determine actual bit rates or information about actual bit rates of the data streams. The information about the actual bit rates may include a real time short-term bit rate, a maximum bit rate over the real time short-term bit rate, and/or a minimum bit rate over the real time short-term bit rate. The real time short-term bit rate may be measured by analyzing pairs of packets and/or by calculating a number of bits that are included or carried in the packets of the data streams over a moving window. The moving window may have a size (e.g., Tw seconds), and a moving step (e.g., Tw/2 seconds). In some examples, the size Tw may be in a range of about 1 to 5 seconds. As an illustration, a real time short-term bit rate may be calculated from three sets of consecutive packets received by the first network node 102 within three consecutive moving steps of a window. A first set of packets pkt[1], pkt[2] ... pkt[n] having respective packet lengths len[1], len[2] ... len[n] may be received by the first network node 102 within a first moving step; a second set of packets pkt[n+1], pkt[n+2] ... pkt[n+3] having respective packets lengths len[n+1], len[n+2] ... len[n+m] within a second moving step; and a third set of packets pkt[n+m+1], pkt[n+m+2] ... pkt[n+m+1] having respective lengths len[n+m+1], len[n+m+2] ... len[n+m+1], with a third moving step. From the received packets, one or more real time short-term bit rates may be calculated. For example, a first real time short-term bit rate BR[1] may be calculated for the first and second sets of packets, and a second real time short-term bit rate BR[2] may calculated for the second and third sets of packets. In one example, the first real time short-term bit rate may be calculated using the following equation:

$$BR[1] = 8 * \frac{(len[1] + len[2] + \ldots + len[n] + len[n+1] + len[n+2] + \ldots len[n+m]}{Tw}.$$

Similarly, the second real time short-term bit rate may be calculated using the following equation:

$$BR[2] = 8 * \frac{(len[n+1] + len[n+2] + \ldots + len[n+m] + len[n+m+1] + len[n+m+2] + \ldots len[n+m+l]}{Tw}$$

From the real time short-term bit rates, a maximum bit rate and/or a minimum bit rate may be extracted. In some configurations, the local network node 102 may continually update the maximum and/or minimum bit rates as packets are received and real time short term bit rates are determined.

Figure 2:
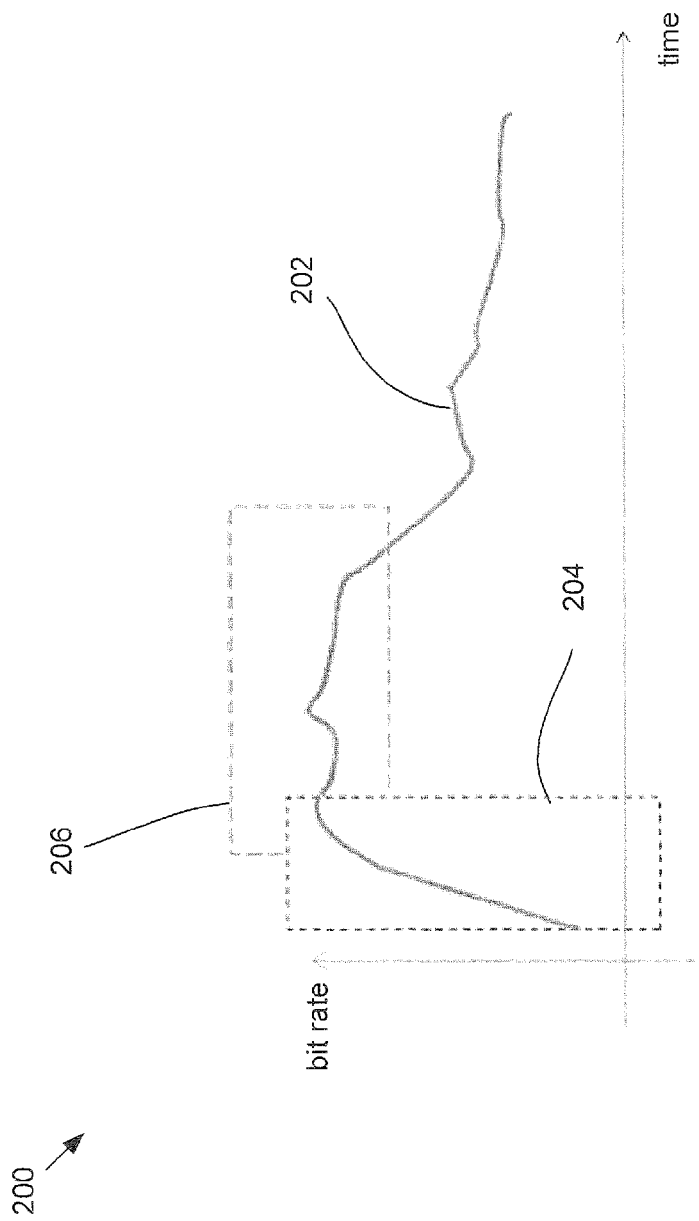
FIG. 2 illustrates a bit rate curve as a function of time.

In addition, the local network node 102 may determine a real time average bit rate from the real time short-term bit rates. From the real time average bit rate, a saturated maximum bit rate may be determined, which the local network node 102 may use for the maximum bit rate. The saturated maximum bit rate may indicate or reflect that the maximum allowed bit rate was used to encode the bit rate. In some situations, the saturated maximum bit rate may be determined by detecting or examining a "rapid" transition from a low bit rate to a high bit rate. FIG. 2 shows a graph 200 illustrating an example bit rate curve 202 as a function of time. As shown in FIG. 2, the bit rate may initially rise at a relatively rapid rate for a first period of time 204. The bit rate may then remain relatively constant for a second period of time 206. The local network node may identify the bit rate level, or an averaged bit rate level, during the second period of time 206 as the saturated maximum bit rate.

Alternatively or additionally, the local network node may determine the saturated maximum bit rate by identifying a quantization step that may be carried in the data stream in accordance with codec specifications. A quantization step close to a maximum quantization step, $Q_{max}$ may indicate heavy compression, which may indicate that the endpoint encoded the data stream using all or substantially all of the available bits in order to maximize the peak signal-to-noise ratio (PSNR) of the data stream. By identifying the maximum quantization step $Q_{max}$, the local network node 102 may determine the saturated maximum bit rate of the data stream.

Referring back to FIG. 1, the local network node 102 may be configured to identify or estimate, for each data stream, how far from the stream's target bit rate the endpoint 106a, b, or c is encoding the data stream. The identification or estimation, in turn, may provide an indication as to whether the transmission of the data streams is balanced. The local network node 102 may be configured to make the identification or estimation at one or more predetermined time intervals and/or upon identification of a triggering event. For example, the local network node 102 may make the identification or estimation upon receipt of packet drop information, such as from a RTCP report received from over the network 104. Alternatively, the local network node 102 may make the identification or estimation at one or more time intervals that correspond and/or are associated with the times at which one or more of the endpoints 106a-c are configured to adjust their bit rates. Other time intervals or triggering events that prompt the local network node 102 to make the identification or estimation are possible.

The local network node 102 may identify or estimate how far from the stream's target bit rate the endpoint 106a, b, or c is encoding the data stream by determining a difference between the maximum bit rate and the target bit rate. For an nth data stream, the difference may be determined using the following equation:

DeltaBitRate[n]=MaxRTBitRate[n]−TargetBitRate[n], where MaxRTBitRate is the maximum bit rate, TargetBitRate is the target bit rate, and DeltaBitRate is the difference. A difference of zero or substantially zero may indicate that the transmission is balanced and no packets are being dropped. If the local node 102 determines the difference to be zero or substantially zero, then the local node 102 may determine that packet drop is zero or negligible, and as such may determine not to perform any bit rate adjustment.

Alternatively, a non-zero difference or a substantially non-zero difference (i.e., a difference greater than or less than zero, a value other than zero or substantially zero, or sufficiently away from zero) may indicate that the transmission is unbalanced. In some situations, a non-zero difference or substantially non-zero difference may be any value other than zero. In other situations, a non-zero difference or a substantially non-zero difference may be a value that is outside of a predetermined range centered or around zero. The range may define a set of values that, if the difference is within the range, causes the local network node 102 to leave the packet drop rate unchanged. If the difference falls within the range, then the difference may be considered a substantially zero value such that the local network node 102 does not adjust the packet drop rate. Alternatively, if the difference falls outside the range, then the difference may be considered a substantially non-zero value such that the local network node 102 adjusts the packet drop rate.

If the difference is non-zero or substantially non-zero, then the local network node 102 may be configured to adjust its current packet drop rate. The adjustment in the packet drop rate may be based on and/or proportional to the amount of the difference and whether the difference is positive or negative. If the difference is positive (i.e., the maximum bit rate is greater than the target bit rate), then the local network node 102 may be configured to increase its current packet drop rate. The increase in the drop rate may be based on and/or proportional to the amount of the positive difference. Alternatively, if the difference is negative (i.e., the maximum bit rate is less than the target bit rate), then the local network node 102 may be configured to decrease its current packet drop rate. The decrease in the packet drop rate may be based on and/or proportional to the amount of the negative difference. Additionally, if the amount that the local network node 102 determines to decrease the current packet drop rate renders the current packet drop rate negative, then the local network node 102 may set its packet drop rate to zero.

In order to adjust its current packet drop rate for each stream, the local network node 102 may first determine its current packet drop rate for each stream. In some configurations, the local network node 102 may be configured to internally determine its packet drop rate. For example, as the local network node 102 receives data streams from the endpoints 106a-c and communicates the data streams over the network 104, the local network node 102 may be configured to keep track of its packet drop rates for the streams. In alternative configurations, the local network node 102 may be unable to internally determine its packet drop rates, or the packet drop rates may be otherwise unavailable to the local network node 102. In these alternative configurations, the local network node 102 may determine its current packet drop rates using external information, such as from feedback information (e.g., packet drop rate information in a RTCP report), that it receives from over the network 104.

When the local network node 102 determines its current packet drop rate for each stream, the local network node may then adjust the current packet drop rate for each stream by an amount that is based on and/or proportional to the difference between the maximum bit rate and the target bit rate. As previously described, if the difference is zero or substantially zero, then the local network node 102 may determine not to adjust the current packet drop rate. After the local network node 102 adjusts the packet drop rates for each of the streams, the local network node 102 may transmit packets over the network 104 at the adjusted packet drop rate.

The local network node 102 may be configured to provide information about the adjusted packet drop rates to the respective endpoints 106a-c. In some configurations, the local network node 102 may provide the information about the adjusted packet drop rates to the endpoints 106a-c by forwarding to the endpoints 106a-c feedback information (e.g., information in a RTCP report) that the local network node 102 receives. For example, after the local network node 102 adjusts its packet drop rates and transmits the data streams at the adjusted packet drop rates to the second network node 108 and the receiving endpoints 110a-c, the receiving endpoints 110a-c and/or the second network node 108 may generate feedback information, such as RTCP reports, that include information about or that reflects the adjusted packet drop rates. The second network node 108 may transmit the information about the packet drop rates to the local network node 102, which in turn, may provide the information to the endpoints 106a-c. In addition or alternatively, the endpoints 106a-c may "sniff" the adjusted packet drop rate information from the local network node 102. The endpoints 106a-c may then adjust their bit rates in accordance with the adjusted packet drop rate information provided by the local network node 102.

The local network node 102 may be configured to continually adjust its packet drop rates until the data streams are being transmitted at or substantially at their target bit rates—i.e., until the differences between the actual maximum bit rates derived from the real time short-term bit rates and the target bit rates of the data streams are zero or substantially zero. By making the adjustments based the differences, and then providing the adjusted packet drop information to the endpoints 106a-c, the endpoints 106a-c may adjust their bit rates such that transmission of the data streams eventually becomes both balanced and unbiased. In this way, the local network node 102 may control the adjustment of the bit rates by the endpoints 106a-c to achieve a transmission of data streams that is both balanced and unbiased.

In alternative example configurations of the example system 100, all of the transmitting endpoints 106a-c may not be rate adaptive endpoints. That is, at least one transmitting endpoints 106a-c may be a non-rate adaptive endpoint without any ability to adjust its bit rate or have its bit rate adjusted by an associated rate adaption device or mechanism. Where at least one of the transmitting endpoints 106a-c is a non-rate adaptive endpoint, those transmitting endpoints 106a-c that do have rate-adaptation capabilities (either by being configured with a rate adaptation algorithm or by communicating with an associated rate adaption device), may reduce their bit rates further than if all of the transmitting endpoints were rate-adaptive in order to achieve a balanced transmission.

In these alternative example configurations, the transmitting endpoints 106a-c with rate-adaptation capabilities may have different rate adaption algorithms or schemes and/or may adjust bit rates at different times and/or at different adjustment speeds. In conventional configurations, the endpoints 106a-c with rate adaptation capabilities may transmit their data streams at different bit rates, even when the transmission becomes balanced. However, by having a local network node 102 that is configured to control and/or manage the transmission of data streams as described above, bias or unfairness in the bit rates caused by the non-rate adaptive endpoints 106-a-c may be reduced and/or minimized in that the local network node 102 may drop the packets in the data streams provided by the non-rate adaptive endpoints. Additionally, bias or unfairness in the bit rates between rate adaptive endpoints having different adaption algorithms may be reduced and/or minimized due the above-described data stream control and management capabilities of the local network node 102.

In still other alternative example configurations of the example system 100, the receiving endpoints 110 a-c may not be located across the network 104, but instead may be located on the same side of the network 104 as the transmitting nodes 106 a-c and communicate with the transmitting endpoints 106 a-c through a different or the same interface of the local node 102 through which the transmitting nodes 106 a-c communicate. In these configurations, the transmitting nodes 106 a-c, the local network node 102, and the receiving nodes 110 a-c may function or perform the same or substantially the same, except that the communicated information, including the data streams and the feedback information, may not be communicated through the network node 108 and/or over the network 104.

FIG. 1 shows three transmitting endpoints 106a-c and three endpoints 110a-c, although any number of endpoints 106a-c or endpoints 110a-c configured to transmit and receive data streams may be included in the system 100. Additionally, the number of endpoints 106, 110 in the system 100 may change. For example, the endpoints 106, 110 may enter and leave the system 100 at various points in time. Additionally, each of the endpoints 106, 110 may include one or more interfaces, such as interfaces implemented in hardware, that are configured to transmit data streams to and/or receive data streams from the local network nodes 102, 108.

The network nodes 102, 108 and the endpoints 106, 110 may each include a processor C configured to perform the above described functions. The processor C may be a general processor, a digital signal processor, an application specific integrated circuit, a field programmable gate array, an analog circuit, a digital circuit, combinations thereof, or other now know known or later developed processors. The processor C may be a single device or a combination of devices, such as associated with a network or distributed processing. Any of various processing strategies may be used, such as multi-processing, multi-tasking, parallel processing, remote processing, or the like. The processor C may be responsive to and/or configured to execute instructions stored as part of software, hardware, integrated circuits, firmware, micro-code, or the like.

In addition, the network nodes 102, 108 and the endpoints 106, 110 may each include a memory M in communication with the processor. The memory M may be non-transitory computer readable storage media. The computer readable storage media may include various types of volatile and non-volatile storage media, including but not limited to random access memory, read-only memory, programmable read-only memory, electrically programmable read-only memory, electrically erasable read-only memory, flash memory, magnetic tape or disk, optical media, and the like. The memory M may be a single device or a combination of devices. The memory M may be adjacent to, part of, networked with and/or remove from the processor. Logic encoded in one or more tangible media for execution is defined as the instructions that are executable by the programmed processor and that are provided on the computer-readable storage media, memories, or a combination thereof.

The memory M may be a computer readable storage media having stored therein data representing instructions executable by the programmed processor. The memory M may store instructions for the processor. The processor C may be programmed with and execute the instructions. The functions, acts, methods, or tasks illustrated in the figures or described herein are performed by the programmed processor executing the instructions stored in the memory. The functions, acts, methods or tasks are independent of the particular type of instructions set, storage media, processor or processing strategy and may be performed by software, hardware, integrated circuits, firmware, micro-code, and the like, operating alone or in combination. The instructions are for implementing the processes, techniques, methods, or acts described herein.

Additionally, the network nodes 102, 108 and the endpoints 106, 110 may each include one or more input/output (I/O) interfaces I/F in communication with the processor and the memory, and that may be used to communicate with the various components in the system 100. For example, the endpoints 106, 110 may include one or more interfaces I/F to communicate information—e.g., the data streams, packet drop information, feedback information, RTCP reports, etc.—to the network nodes 102, 108. In addition, the network nodes 102, 108 may include one or more interfaces I/F to communicate with the endpoints 106, 110, and also to communicate with the network 104. The interface may be a network interface and/or implemented in hardware, such as a hard-wired or wireless network interface. The interface I/F may be a universal asynchronous receiver/transmitter (UART), a parallel digital interface, a software interface, Ethernet, or any combination of known or later developed software and hardware interfaces.

The network 104 may any type of network, including a local area network (LAN), a wide area network (WAN), an intranet, a virtual private network (VPN), and the Internet, as examples. The network may be wired, wireless, or combinations thereof.

Figure 3:
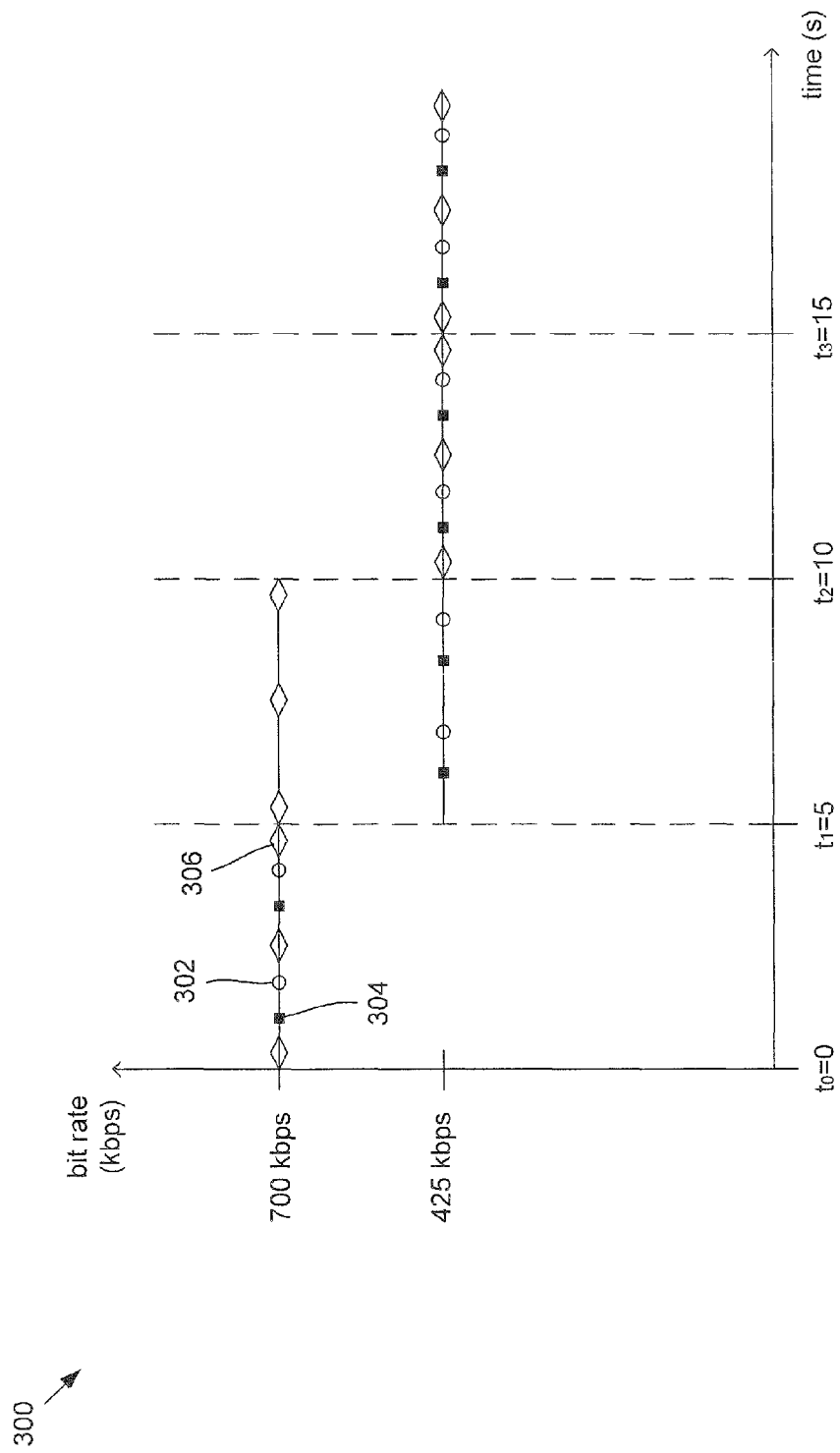
FIG. 3 illustrates a timing diagram illustrating bit rates of data streams being adjusted to balanced and unbiased levels.

FIG. 3 illustrates a timing diagram 300 of an example transmission of data streams in which bit rates are adjusted in three data streams 302, 304, 306 (denoted in FIG. 3 by lines with circles, squares, and diamonds, respectively) so their transmission becomes balanced and unbiased. The example transmission assumes a total bandwidth $BW_t$ of 1.5 Mbps. Additionally, each data stream has an initial bit rate of 700 kbps, which is shown at an initial time $t_0$. A total stream bit rate $BT_t$ of 2.1 Mbps, which is greater than the total bandwidth $BW_t$ of 1.5 Mbps, may be determined from the initial bit rates. From the total bandwidth $BW_t$, the initial bit rates, and the total stream bit rate $BT_t$, a target bit rate for each of the three streams may be determined, which is about 500 kbps or 71% (1.5 Mbps/2.1 Mbps) of the initial bit rate for each data stream. Additionally, the endpoints transmitting the data streams may be configured with different adaption algorithms or schemes, which may be different at least because they have different adjustment speeds. In the example transmission shown in FIG. 3, first and second data streams 302 and 304 have an adjustment speed of once every five seconds, whereas third data stream 306 has an adjustment speed of once every ten seconds. The timing diagram shows time intervals every five seconds. Time $t_1$ is at 5 seconds from the initial time $t_0$, time $t_2$ is at 10 seconds from the initial time $t_0$, and time $t_3$ is at 15 seconds from the initial time $t_0$.

At time $t_1$, the endpoints transmitting the first and second data streams 302 and 304 may determine to adjust their bit rates based on packet drop rate information received from a local network node. The packet drop rate information may be indicative of or reflect adjusted packet drop rates as determined and/or performed by the local network node, which adjusted the packet drop rates based and/or proportional to how far the initial bit rates of 700 kbps differed from their target bits rates of 500 kbps. In the example timing diagram shown in FIG. 3, the local network node adjusted its packet drop rate so that the endpoints transmitting data streams 302 and 304 were dropped from 700 kbps to about 425 kbps.

Subsequently, at time $t_2$, the endpoints transmitting all three data streams 302, 304, and 306 may determine whether to adjust their bit rates based on packet drop rate information received from a local network node. During the time period between time $t_1$ and time $t_2$, the local network node may determine, based on comparisons or differences of the actual bit rates of the data streams 302, 304, and 306 and their corresponding target bit rates, not to drop packets for the first and second data streams 302, 304 (i.e., set the packet drop rates for the first and second data streams 302, 304 to zero), and to increase the packet drop rate for the third data stream 306. This packet drop information may be provided to the endpoints transmitting the data streams 302-306, such as through generation of a RTCP report. In response to receiving the information, the endpoints transmitting the first and second data streams 302, 304 may leave their bit rates unadjusted or unchanged. However, the endpoint transmitting the third data stream 306 may determine to adjust its bit rate. Based on the adjusted packet drop rate determined by the local network node, and reflected in the packet drop information provided by the local network node, the endpoint transmitting the third data stream 306 may lower its bit rate to about 425 kbps—the same or substantially the same bit rate as the adjusted bit rates of the first and second data streams 302, 304. Because the data streams are not being transmitted at bit rates that are below the total bandwidth $BW_t$ of the network, and are also the same or substantially the same, the transmission of the data streams 302-306 is not balanced and unbiased.

Thereafter, the local network node may determine not to drop any packets, or set its packet drop rate to zero for all of the data streams. As such, feedback information provided by the local network node to the transmitting endpoints may indicate a packet drop rate of zero, which in turn, may cause the transmitting endpoints to leave their bit rates unchanged or unadjusted.

Figure 4:
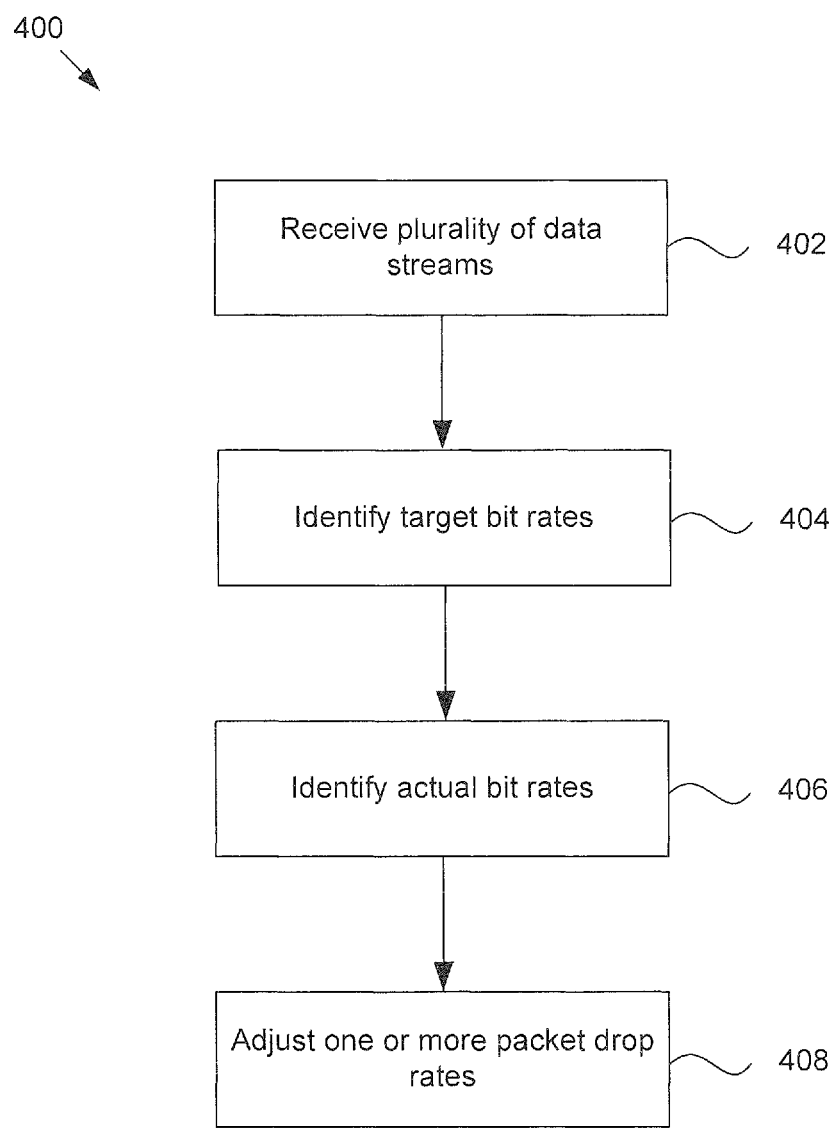
FIG. 4 illustrates a flow diagram of an example method of controlling a transmission of data streams to be balanced and unbiased.

FIG. 4 illustrates a flow diagram of an example method of controlling a transmission of data streams to be balanced and unbiased. At block 402, a plurality of data streams for transmission over a network may be received by a network node. At block 404, target bit rates for the plurality of data streams may be identified by the network node. At block 406, actual bit rates for the plurality of data streams may be identified. The actual bit rates may include real time short-term bit rates and/or maximum/minimum bit rates derived from the real time short-term bit rates. At block 408, one or more packet drop rates may be adjusted based on comparisons of the actual bit rates and the target bit rates.

Figure 5:
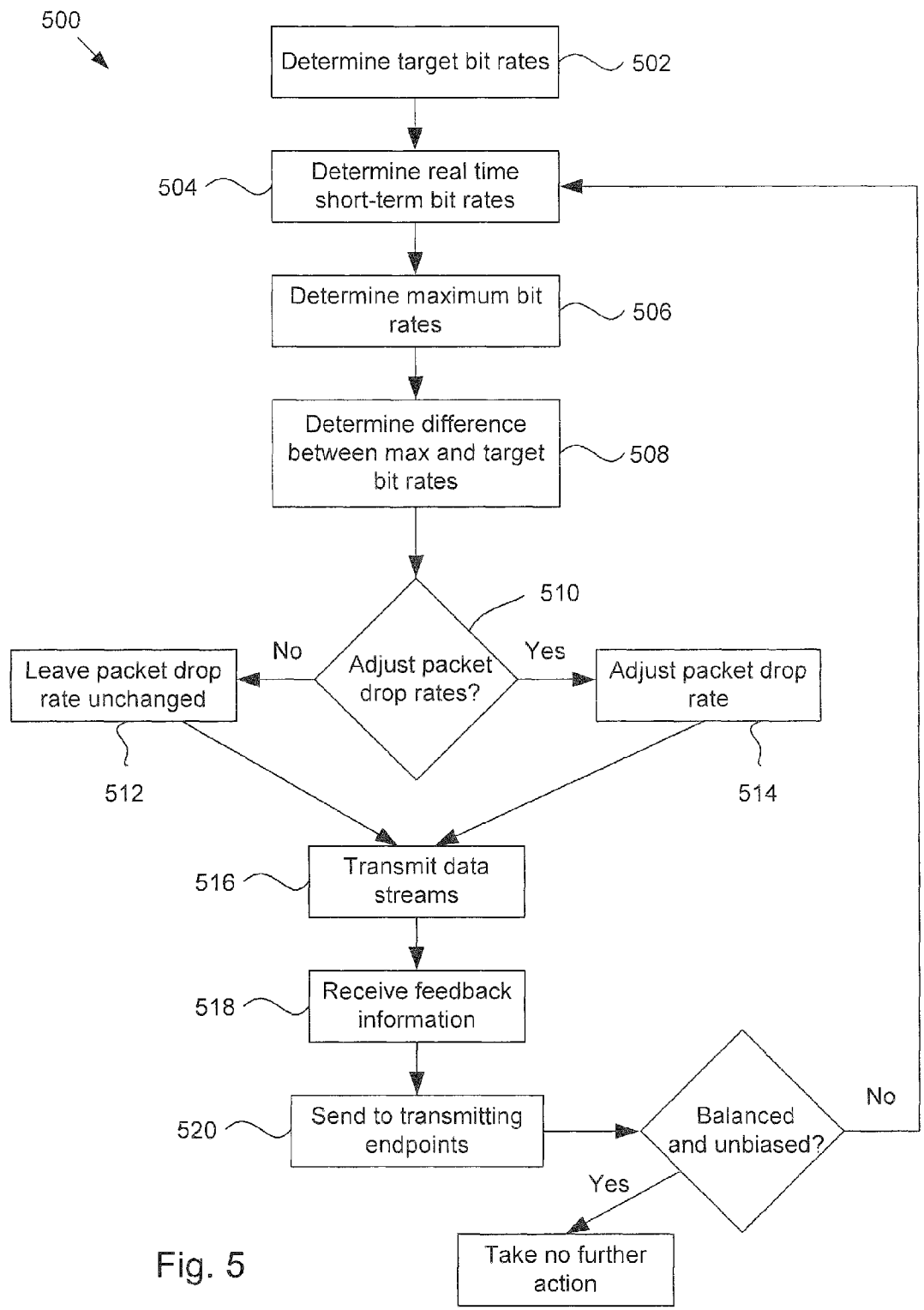
FIG. 5 illustrates a flow diagram of an alternative example method of controlling a transmission of data streams to be balanced and unbiased.

FIG. 5 illustrates a flow diagram of an alternative example method of controlling a transmission of data streams to be balanced and unbiased. At block 502, a network node may determine target bit rates for a plurality of data streams received from transmitting endpoints that the network node may communicate over a network. At block 504, the network node may determine real time short-term bit rates for the plurality of data streams. The real time short-term bit rates may be determined by measuring packet lengths of received packets of the data streams. At block 506, the network node may determine minimum and/or maximum bit rates of the data streams from the real time short-term bit rates. At block 508, the network node may determine a difference between the maximum bit rates and the target bit rates for the data streams. The network node may determine the difference at a predetermined time interval or at a triggering event, such as upon reception of a RTCP report.

At block 510, the network node may determine whether to adjust its packet drop rate for each data stream. The network node may make the determination based on the difference between the maximum bit rates and the target bit rates. If the difference is zero or substantially zero, then at block 512, the network node may leave its packet drop rate for the data stream unchanged. Alternatively, if the difference is non-zero or substantially non-zero, then at block 514, the network node may adjust its packet drop rate for the data stream. As previously described, the network node may increase or decrease the packet drop rate based on whether the maximum bit rate is less than or greater than the target bit rate.

At block 516, the network node may transmit the data streams over the network, while dropping packets at the adjusted packet drop rates. At block 518, the network node may receive feedback information, such as in the form of a RTCP report, from over the network. The feedback information may include information about the adjusted packet drop rates. At block 520, the network node may send the feedback information to the transmitting endpoints, which may adjust or adapt the bit rates at which the data streams are being encoded based on the adjusted packet drop rates.

At block 522, the network node may determine whether transmission of the data streams is balanced and unbiased. The network node may make the determination based on whether the differences between the maximum bit rates and the target bit rates for all the data streams are zero or substantially zero. If the transmission is balanced and unbiased, then at block 524 the network node may make no more packet drop rate adjustments. Alternatively, if the transmission is not balanced and unbiased, then the method may proceed back to block 504 where the network node determines real-time short term bit rates of the data streams and determines whether to make bit rate adjustments for one or more of the data streams.

In an alternative example method, the network node may continually measure the real time short-term bit rates and make comparisons between the maximum bit rates and the target bit rates, even if the network node determines the transmission is balanced and unbiased. As such, if the network node determines that the transmission is balanced and unbiased at block 522, the method may still proceed back to block 504 where the network node determines the real time short-term bit rates for the data streams.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. An apparatus comprising:
one or more network interfaces configured to receive a plurality of data streams from a plurality of endpoints and transmit the plurality of data streams over a network; and
a processor circuit in communication with the one or more network interfaces, the processor circuit configured to:
for each of the plurality of data streams:
determine a target bit rate at which a respective one of the plurality of endpoints is to transmit the data stream, wherein the target bit rate is based on a ratio of a bandwidth available for transmission of the plurality of data streams to a total stream bit rate, wherein the total stream bit rate is a sum of initial bit rates of the plurality of data streams;
determine a difference between an actual bit rate and the target bit rate of the data stream;
adjust a packet drop rate by an amount that is based on the difference.

2. The apparatus of claim 1, wherein, for each of the plurality of data streams, the target bit rate comprises a bit rate that yields a balanced transmission of the plurality of data streams.

3. The apparatus of claim 1, wherein the processor circuit is further configured to:
for each of the plurality of data streams:
adjust the packet drop rate in response to the difference being an amount that is substantially non-zero; and
leave the packet drop rate unchanged in response to the difference being an amount that is at or sufficiently close to zero.

4. The apparatus of claim 1, wherein the processor circuit is further configured to:
send information about one or more adjusted packet drop rates to one or more of the plurality of endpoints, the one or more adjusted packet drop rates reflecting an adjustment of one or more of the packet drop rates performed by the apparatus.

5. The apparatus of claim 1, wherein the processor circuit is further configured to:
send a real-time transport protocol control protocol (RTCP) report that includes information about one or more adjusted packet drop rates, the one or more adjusted packet drop rates reflecting an adjustment of one or more of the packet drop rates performed by the apparatus.

6. The apparatus of claim 5, wherein the processor circuit is further configured to receive the RTCP report from over the network and adjust the one or more of the packet drop rates prior to sending the RTCP report including the information about the one or more adjusted packet drop to at least one of the plurality of endpoints.

7. The apparatus of claim 1, wherein the processor circuit is further configured to:
for each data stream:
adjust the packet drop rate by an amount that is proportional to an amount of the difference.

8. The apparatus of claim 1, wherein, for each of the plurality of data streams, the actual bit rate comprises a real-time short term bit rate measured from packets of the data stream.

9. The apparatus of claim 1, wherein, for each of the plurality of data streams, the actual bit rate comprises a maximum bit rate of a plurality of real time short-term bit rates.

10. The apparatus of claim 9, wherein the maximum bit rate comprises a saturated maximum bit rate determined from a quantization step carried in the data stream.

11. The apparatus of claim 2, wherein, for each of the plurality of data streams, the target bit rate further comprises a bit rate that yields both a balanced and unbiased transmission of the plurality of data streams.

12. The apparatus of claim 1, wherein for each of the plurality of data streams, the target bit comprises the ratio multiplied by an initial bit rate of the data stream.

13. An apparatus comprising:
one or more network interfaces configured to receive a plurality of data streams from a plurality of endpoints and transmit the plurality of data streams over a network; and
a processor circuit in communication with the one or more network interfaces, the processor circuit configured to:
for each of the plurality of data streams:
determine a target bit rate at which a respective one of the plurality of endpoints is to transmit the data stream;
determine a difference between an actual bit rate and the target bit rate of the data stream, wherein the actual bit rate comprises a saturated maximum bit rate determined from a first time period indicative of rapid transition from a low bit rate to a high bit rate and a second period of time indicative of a relatively constant bit rate; and
adjust a packet drop rate for the data stream by an amount based on the difference.

14. A method comprising:
receiving, with at least one processor circuit, a plurality of data streams from a plurality of endpoints for transmission over a network;

identifying, with the at least one processor circuit, target bit rates at which the plurality of endpoints are to transmit the plurality of data streams, wherein each of the target bit rates is based on
  a ratio of a bandwidth available for transmission of the plurality of data streams to a total stream bit rate, wherein the total stream bit rate is a sum of initial bit rates of the plurality of data streams;
measuring, with the at least one processor circuit, actual bit rates for the plurality of data streams; and
adjusting, with the at least one processor circuit, at least one packet drop rate for at least one of the plurality of data streams, the adjusting based on comparisons of the actual bit rates and the target bit rates.

15. The method of claim 14, wherein adjusting at least one packet drop rate for at least one of the plurality of data streams comprises:
  continually adjusting, with the at least one processor circuit, the at least one packet drop rate until the transmission of the plurality of data streams is balanced.

16. The method of claim 14, further comprising:
  adjusting, with the at least one processor circuit, the at least one packet drop rate in response to the comparison yielding a difference that is substantially non-zero.

17. The method of claim 15, wherein adjusting at least one packet drop rate for at least one of the plurality of data streams further comprises: adjusting the at least one packet drop rate until the transmission of the plurality of data streams is both balanced and unbiased.

18. The method of claim 16, wherein adjusting the at least one packet drop rate comprises:
  adjusting, with the at least one processor circuit, the at least one packet drop rate in an amount that is proportional to the difference.

19. The method of claim 14, further comprising:
  sending, with the at least one processor circuit, information about one or more adjusted packet drop rates to one or more of the plurality of endpoints, the one or more adjusted packet drop rates reflecting an adjustment of one or more of the packet drop rates performed by the apparatus.

20. A system comprising:
a plurality of rate-adaptive endpoints configured to generate and transmit data streams at adaptive bit rates; and
a local network node in communication with the plurality of endpoints, the local network node comprising:
  a network interface configured to transmit the data streams over a network; and
  a processor circuit configured to:
    determine target bit rates at which the plurality of endpoints are to transmit the data streams, wherein each of the target bit rates is based on
      a ratio of a bandwidth available for transmission of the data streams to a total stream bit rate, wherein the total stream bit rate is a sum of initial bit rates of the data streams;
    and
    control the bit rates at which the plurality of rate-adaptive endpoints encode the data streams by being configured to adjust at least one packet drop rate of at least one of the data streams based on comparisons of actual bit rates and the target bit rates of the data streams.

21. The system of claim 20, wherein the target bit rates comprise bit rates that yield a balanced transmission of the data streams over the network.

22. The system of claim 21, wherein the target bit rates comprise bit rates that yield both a balanced and unbiased transmission of the data streams over the network.

23. The system of claim 20, wherein the processor circuit is configured to adjust the at least one packet drop rate in proportion to differences between the actual bit rates and the target bit rates.

24. The system of claim 20, wherein the network node is configured to provide the plurality of rate-adaptive endpoints with packet drop information that reflects the adjustment of the at least one packet drop rate.

* * * * *